2,858,284
NON-CAKING FLATTING AGENT FOR VARNISHES

Ellsworth G. Acker and Luther O. Young, Baltimore, Md., assignors to W. R. Grace & Co., New York, N. Y., a corporation of Connecticut No Drawing. Application April 11, 1955
Serial No. 500,665

17 Claims. (Cl. 260—19)

This invention relates to a flatting agent and more particularly to a silica gel flatting agent for varnishes, to a method of preparing it, and to a flat varnish composition containing the novel flatting agent. This application is a continuation-in-part of our application Serial Number 163,798, filed May 23, 1950 (now abandoned).

Flatting agents are commonly used in varnishes and other coating compositions to reduce the gloss of the finished surface. The flatting agents are usually finely divided particles capable of deflecting the path of light, and silica gel is sometimes used for this purpose. The silica flatting agents have for the most part been silica gels in which the original gel structure has been maintained unimpaired. Such gels are denominated aerogels to distinguish them from silica gels in which the original structure has been destroyed. The latter silica gels are known as xerogels.

It is well known that when a sicila hydrogel is dried by normal evaporation of the continuous original aqueous phase the solid gel structure is collapsed to a large extent. It is believed that the fine fibers constituting the solid phase of the gel do not possess sufficient mechanical strength to resist the forces exerted by the menisci of the continuous phase as they recede on evaporation. Normal evaporation of the continuous aqueous phase causes considerable shrinkage of the gel. Aerogels, on the other hand, are formed by removal of the original continuous phase under conditions such that surface tension of the liquid continuous phase is very small. The original aqueous phase may be removed by immersing the hydrogel in successive baths of a miscible organic liquid such as an ether or an alcohol. When the surface tension of the new continuous phase is very small, its removal may be effected by normal evaporation without destroying or shrinking the gel structure. If the surface tension is high, the new continuous phase may be removed without the formation of menisci above the critical temperature of the liquid constituting the continuous phase. Thus the formation of silica aerogel is a time consuming and expensive process when compared with the formation of shrunk silica gel, i. e., a silica xerogel.

For years silica aerogel was the preferred silica gel flatting agent for varnish, because of the ease with which it could be milled into the varnish base, as compared with silica xerogel. However, in the fifteen years elapsed since the issuance of U. S. Patent No. 2,180,145, which claimed a flat coating composition containing a silica aerogel having substantially the structure of the gel as originally formed, much progress has been made in the fine grinding art. With the fluid energy mill it is now possible to prepare a very finely divided silica xerogel which may be incorporated into the varnish base with the ease of silica aerogel. Furthermore, because the silica xerogel is fully shrunk during drying, it is structurally much stronger than a silica aerogel possessing the original gel structure made up of a multiplicity of fine fibers. During milling of silica aerogel into the varnish the original gel structure is broken down to some extent, and over grinding will result in reduced flatting power. Silica xerogels, having a much harder nucleus are not nearly so susceptible to over grinding. At the present time, silica xerogel flatting agents are daily replacing the more costly aerogels in the paint and varnish fields.

Although eminently suited for use as a varnish flatting agent, silica xerogel has been subject heretofore to the serious disadvantage that it settles to a hard cake or semi-solid mass when the varnish is allowed to stand. This mass can be redispersed in the varnish only by extended shaking. In some instances, it is necessary to remove some of the liquid vehicle from the container of varnish and stir the cake with a paddle while the liquid vehicle is slowly added. In instances of extreme caking, a satisfactory redispersion of the semisolid mass through the varnish cannot be obtained.

The present invention provides a fully shrunk silica gel or silica xerogel flatting agent for varnishes which will not form a hard cake in the bottom of the varnish container, but rather forms a soft and flocculent cake which may readily be dispersed throughout the varnish. The present invention also provides a method of preparing a flatted varnish containing the novel fully shrunk silica gel flatting agent.

In preparing the silica gel flatting agent according to this invention, silica gel is formed in an aqueous medium in a conventional manner, for example, by neutralizing a solution of sodium silicate with a mineral acid to form a silica hydrosol, which sets, on standing, to a hydrogel. The hydrogel is washed substantially free of soluble salts with water and then dried at an elevated temperature in an oven or a stream of hot gas, whereby the continuous aqueous phase is rapidly removed by evaporation and without regard to preserving the original gel structure. The resulting silica gel exhibits a total moisture content of about 20%, and is for all practical purposes a fully shrunk gel or xerogel. It is then passed through a micronizer or other suitable apparatus for grinding to such a fineness that about onehalf of the material will have an average diameter of from 1 to 15 microns, the total range being from about 1 to 50 microns. The silica gel may then be activated at a temperature of about 850°–900° F. during which it is dried to a total volatile content of around 3–4%.

In preparing the flatting agent of this invention, the finely ground silica gel is impregnated with sufficient low molecular weight alcohol to form a gel containing about 50% alcohol. This gel is dispersed in a varnish base in the proper concentration to form a non-caking flat varnish. A typical flat varnish may contain as little as 5% or as much as 15% or even 20% by weight silica gel in the varnish solids.

The following examples illustrate methods by which the anti-caking agent for varnishes may be prepared according to this invention. It will be understood that the details set forth in the following examples are for purposes of illustration only and that the invention is not limited to them.

EXAMPLE I

Three hundred and fifty grams of anhydrous denatured alcohol, containing 95% anhydrous ethyl alcohol and 5% anhydrous methyl alcohol, were mixed with 100 grams of silica gel which had been micronized. This formed a slurry. The excess alcohol was filtered off, and the solid was dried at 140° F. until the total volatile was 55%. The alcohol impregnated gel was ball milled for eight hours with 50 grams of naphtha or mineral spirits and 300 grams of an oleoresinous varnish identified as V–656 and manufactured by Lowe Brothers, Dayton, Ohio. According to the manufacturer's specification, V–656 contains the following oils: 48.5% China wood, 48.5% dehydrated castor and 3% bodied linseed, which were cooked with a modified phenolic resin identified as Rohm and Haas "Amberol F," and the cooked mixture diluted with mineral spirits and toluol to make approximately a 50% solution. V-656 is specified as approximately a 20-gallon varnish. When ball milling was completed, the mill base was mixed with a quantity of varnish which would result in the silica being 7% of the varnish solids.

Portions of the flat varnish were set aside and inspected periodically as to the condition of the settled cake. These inspections showed that the cake stayed soft and flocculent and could easily be redispersed in the varnish by a single manual shake.

EXAMPLE II

One-hundred grams of micronized silica-gel, 100 grams of anhydrous denatured alcohol, containing 95% anhydrous ethyl alcohol and 5% anhydrous methyl alcohol, 300 grams of V-656 varnish, and 50 grams of mineral spirits were placed in a ball mill half full of balls. This was turned for eight hours. A dilution was made in the same manner as in Example I, and portions of the varnish were set aside in the same manner. The cake formed remained soft and flocculent and could be dispersed with a single shake.

Silica gel flatting agents were prepared by impregnating silica gel of the proper particle size with other alcohols. These flatting agents were dispersed in V-656 varnish in the manner described above and the number of shakes required to disperse the cakes was determined. The results of the test are set forth in Table I. Since the total volatile of the original silica gel was in the neighborhood of from 3-4%, the total volatile set forth in the following table is substantially all alcohol.

Table

| Alcohol | Total Volatile | No. of Shakes to Disperse |
| --- | --- | --- |
| None | | Over 350. |
| Methyl | 47.3 | 2. |
| Ethyl | 55.0 | 1. |
| Ethyl | 26.9 | Over 100. |
| Isopropyl | 55.5 | Over 200. |
| Butyl | 61.8 | 1. |
| Octanol | 63.1 | Over 108. |

The improved silica gel flatting agent comprising this invention may be prepared in general with any low molecular weight monohydric alcohol except isopropyl alcohol. Even that alcohol allows an improvement in anticaking properties over silica gel alone. As indicated in Table, it is necessary to introduce sufficient alcohol into the silica gel to obtain an alcohol concentration above about 45% by weight. The alcohol used is desirably a primary monohydric alcohol containing less than five carbon atoms.

A flat varnish containing the novel anti-caking flatting agent of this invention may be stored for long periods and then readily redispersed throughout the liquid vehicle of the varnish by shaking. While there is some settling to form a "cake," the cake remains soft and flocculent.

We claim:

1. A flatting agent especially suitable for use in varnish formulations characterized by a reduced tendency to settle on standing and an improved resistance to comminution during milling of the gel into the varnish base with concomitant loss of flatting power, said flatting agent comprising a comminuted silica xerogel having adsorbed thereon about 45–60 percent of a primary monohydric alcohol containing not more than 5 carbon atoms.

2. A flatting agent as set forth in claim 1 in which the alcohol is methyl alcohol.

3. A flatting agent as set forth in claim 1 in which the alcohol is butyl alcohol.

4. A non-caking varnish flatting agent comprising a finely divided silica xerogel having adsorbed thereby at least 45% by weight of ethyl alcohol.

5. A method of manufacturing a silica gel flatting agent for varnishes comprising forming a silica xerogel, grinding the silica xerogel, impregnating the xerogel with an alcohol selected from the group consisting of primary monohydric alcohols containing less than five carbon atoms and mixtures thereof, and drying the impregnated xerogel to a total alcohol content between about 45 and 60% by weight.

6. A method of manufacturing a silica gel flatting agent for varnishes comprising forming a silica xerogel, grinding the silica xerogel, impregnating the xerogel with an alcohol selected from the group consisting of primary monohydric alcohols containing less than five carbon atoms and mixtures thereof, in quantities to form a flatting agent containing at least 45% by weight alcohol.

7. A method as set forth in claim 6 in which the alcohol is methyl alcohol.

8. A method as set forth in claim 6 in which the alcohol is ethyl alcohol, and impregnation is continued to form a flatting agent containing at least 50% by weight alcohol.

9. A method as set forth in claim 6 in which the alcohol is butyl alcohol, and impregnation is continued to form a flatting agent containing at least 60% by weight alcohol.

10. A method as set forth in claim 6 in which the alcohol is a mixture of methyl and ethyl alcohol and impregnation is continued to form a flatting agent containing about 50% silica xerogel.

11. A non-caking flat varnish comprising a varnish base, a silica xerogel, having a particle size suitable for a flatting agent, in an amount between about 5% and 20% of the solids in the varnish base, and between about 45% and 60% by weight of an alcohol selected from the group consisting of primary monohydric alcohols containing less than five carbon atoms and mixtures thereof, based on the weight of silica xerogel.

12. A method of manufacturing a non-caking flat varnish comprising forming a silica xerogel having a particle size suitable for a flatting agent introducing into said xerogel at least 45% by weight of an alcohol selected from the group consisting of primary monohydric alcohols containing less than five carbon atoms and mixtures thereof, and dispersing the alcohol impregnated xerogel in a varnish base.

13. A method as set forth in claim 12 in which the alcohol is methyl alcohol.

14. A method as set forth in claim 12 in which ethyl alcohol is introduced into the xerogel in amount equal to at least 50% by weight of the xerogel.

15. A method as set forth in claim 12 in which butyl alcohol is introduced into the xerogel in amount equal to at least 60% by weight of the xerogel.

16. A method as set forth in claim 12 in which a mixture of methyl and ethyl alcohol is introduced into the xerogel in amount equal to at least 50% by weight of xerogel.

17. A method of manufacturing a non-caking flat varnish comprising forming a silica xerogel, grinding the xerogel to a particle size suitable for a flatting agent, drying the gel to a water content of approximately 3% to 4%, and dispersing the dried, ground xerogel with at least 45% by weight, based on the weight of the xerogel, of an alcohol selected from the group consisting of primary monohydric alcohols and mixtures thereof into a varnish base.

References Cited in the file of this patent

UNITED STATES PATENTS

| | | |
| --- | --- | --- |
| 2,180,145 | Harford | Nov. 19, 1939 |
| 2,396,051 | Laus | Mar. 5, 1946 |